(12) United States Patent
Suarez et al.

(10) Patent No.: US 10,611,283 B2
(45) Date of Patent: Apr. 7, 2020

(54) MULTI-STAGE SEATBACK EXTENSION SYSTEM

(71) Applicant: Rockwell Collins, Inc., Cedar Rapids, IA (US)

(72) Inventors: Alfredo Suarez, Miramar, FL (US); John Iossifidis, Miami, FL (US); Moises Perez, Miami, FL (US); Michael L. Oleson, Parkland, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/129,212

(22) Filed: Sep. 12, 2018

(65) Prior Publication Data

US 2020/0079263 A1 Mar. 12, 2020

Related U.S. Application Data

(63) Continuation-in-part of application No. 16/128,749, filed on Sep. 12, 2018, and a continuation-in-part of application No. 16/128,773, filed on Sep. 12, 2018.

(51) Int. Cl.
*B60N 2/22* (2006.01)
*B60N 2/806* (2018.01)
*B60N 2/809* (2018.01)
*B60N 2/829* (2018.01)

(52) U.S. Cl.
CPC .................................. *B60N 2/829* (2018.02)

(58) Field of Classification Search
CPC ...................................................... B60N 2/829
USPC ...................................... 297/284.3, 353, 410
See application file for complete search history.

(56) References Cited

U.S. PATENT DOCUMENTS

| 5,120,109 | A | * | 6/1992 | Rangoni | ............... | B60N 2/1803 |
| | | | | | | 297/284.3 |
| 5,836,647 | A | * | 11/1998 | Turman | ............... | B60N 2/4228 |
| | | | | | | 297/284.3 X |
| 5,836,651 | A | * | 11/1998 | Szerdahelyi | ......... | B60N 2/2222 |
| | | | | | | 297/410 |

(Continued)

FOREIGN PATENT DOCUMENTS

| DE | 4219941 A1 | 12/1993 |
| DE | 19944719 C1 | 1/2001 |

(Continued)

OTHER PUBLICATIONS

Extended EP Search Report dated Feb. 24, 2020 for EP Application No. 19196778.5.

*Primary Examiner* — Rodney B White
(74) *Attorney, Agent, or Firm* — Suiter Swantz pc llo

(57) ABSTRACT

A multi-stage seatback extension system is disclosed. In embodiments, the multi-stage seatback extension system includes a backrest base assembly, an extendable backrest assembly, and an extendable headrest assembly. The extendable backrest assembly is moveably coupled to the backrest base assembly such that it can be pulled away from the backrest base assembly or pushed toward the backrest base assembly. The extendable headrest assembly is coupled to the extendable backrest assembly so that the headrest assembly can also be extended (or retracted). In this regard, the extendable backrest assembly and the headrest assembly implement a multi-stage (e.g., two stage or more) seatback extension system.

19 Claims, 20 Drawing Sheets

(56) References Cited

U.S. PATENT DOCUMENTS

| | | | | |
|---|---|---|---|---|
| 5,918,940 | A * | 7/1999 | Wakamatsu | B60N 2/067 297/410 |
| 6,290,299 | B1 * | 9/2001 | Frisch | B60N 2/0232 297/410 |
| 7,543,888 | B2 * | 6/2009 | Kuno | B60N 2/0232 297/353 |
| 7,547,068 | B2 * | 6/2009 | Davis | B60N 2/2222 297/353 |
| 7,686,394 | B2 * | 3/2010 | Nishikawa | B60N 2/2222 297/284.3 X |
| 7,780,230 | B2 * | 8/2010 | Serber | B60N 2/0745 297/353 X |
| 7,845,729 | B2 * | 12/2010 | Yamada | B60N 2/0232 297/410 X |
| 8,348,339 | B2 * | 1/2013 | Onuma | B60N 2/002 297/284.3 |
| 2006/0103216 | A1 * | 5/2006 | Hoekstra | B60N 2/832 297/410 |
| 2006/0186719 | A1 * | 8/2006 | Davis | B60N 2/809 297/353 |
| 2007/0145803 | A1 * | 6/2007 | Kopetzky | B60N 2/829 297/410 |
| 2008/0067850 | A1 * | 3/2008 | Stenstrom | B60N 2/062 297/353 |
| 2009/0152925 | A1 * | 6/2009 | Kim | B60N 2/856 297/410 |
| 2011/0031796 | A1 * | 2/2011 | Hong | B60N 2/829 297/410 |

FOREIGN PATENT DOCUMENTS

| | | |
|---|---|---|
| DE | 202013009391 U1 | 4/2014 |
| EP | 2753498 A2 | 7/2014 |

\* cited by examiner

MULTI-STAGE SEATBACK EXTENSION SYSTEM

CROSS-REFERENCE TO RELATED APPLICATIONS

The present application is a continuation-in-part (CIP) of U.S. patent application Ser. No. 16/128,749, titled "EXTENSION ASSIST FOR HEADREST," by John Iossifidis, filed Sep. 12, 2018, which is incorporated herein by reference in its entirety. The present application is also a continuation-in-part (CIP) of U.S. patent application Ser. No. 16/128,773, titled "LINKAGE EXTENSION SYSTEM WITH DAMPED MOTION," by Michael L. Oleson and John Iossifidis, filed Sep. 12, 2018, which is incorporated herein by reference in its entirety.

BACKGROUND

Many aircrafts and other vehicles are being built with smaller, shorter seat backrests for vehicle occupants. In order to support the head, neck, and back of vehicle occupants in seats with shorter backrests, backrest and headrest extension assemblies may be advantageous. The added support of backrest and headrest extension assemblies becomes increasingly important in emergency situations, such as crashes, where supporting the back, neck, and head of vehicle occupants is of utmost importance. However, as seat backrests become shorter, backrest or headrest extension assemblies become larger and heavier. Increasingly heavy backrest or headrest extension assemblies may be difficult for vehicle occupants to move and adjust, particularly from a seated position. Consequently, there is a need in the art for backrest and/or headrest assemblies that are easier to reposition.

SUMMARY

In one aspect, embodiments of the inventive concepts disclosed herein are directed to a multi-stage seatback extension system. In embodiments, the multi-stage seatback extension system includes a backrest base assembly, an extendable backrest assembly, and an extendable headrest assembly. The extendable backrest assembly is moveably coupled to the backrest base assembly such that it can be pulled away from the backrest base assembly or pushed toward the backrest base assembly. The extendable headrest assembly is coupled to the extendable backrest assembly so that the headrest assembly can also be extended (or retracted). In this regard, the extendable backrest assembly and the headrest assembly implement a multi-stage (e.g., two stage) seatback extension system.

In some embodiments, the extendable backrest assembly is moveably coupled to the backrest base assembly by a plurality of extension members coupled to the extendable backrest assembly and a plurality of ports on the backrest base assembly that are configured to receive the extension members. For example, respective ones of the extension members can be configured to slide within respective ones of the ports. The extension members may be infinitely positionable within the ports.

In some embodiments, the extendable headrest assembly includes a stationary member coupled to the extendable backrest assembly, a moveable cross member, at least two lower links, and at least two upper links. The lower links may be rotationally coupled to respective lower pivot joints of the stationary member, and the upper links may be rotationally coupled to respective upper pivot joints of the moveable cross member. Respective ones of the lower links can be coupled to respective ones of the upper links by respective link pivot joints. The links can rotate toward a center of the headrest assembly or away from the center of the headrest assembly to respectively retract or extend the headrest assembly.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
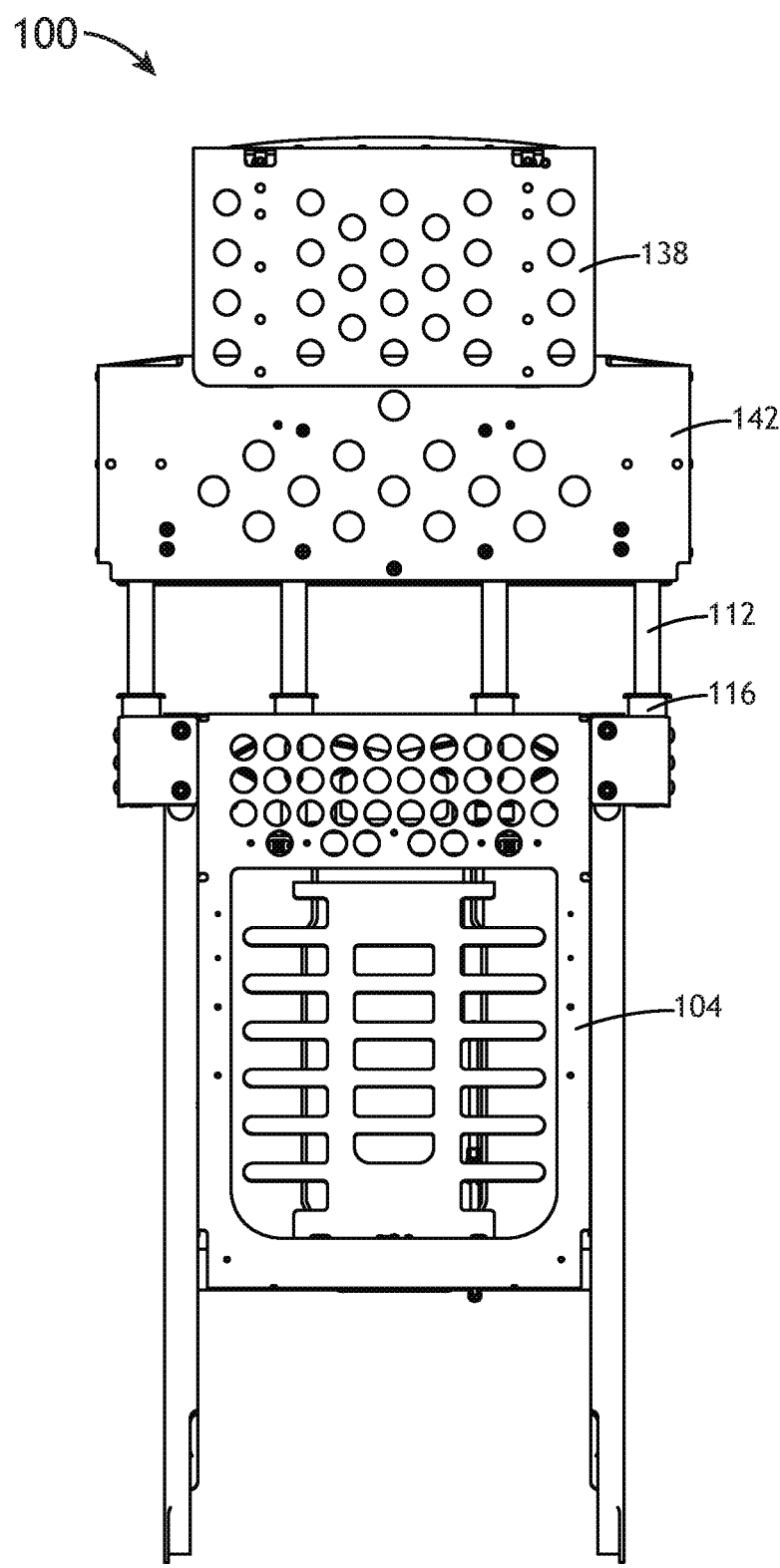
FIG. 1 is a front view of a multi-stage seatback extension system for a passenger chair, wherein the multi-stage seatback extension system is in an extended configuration, in accordance with an example embodiment of this disclosure.
Figure 2:
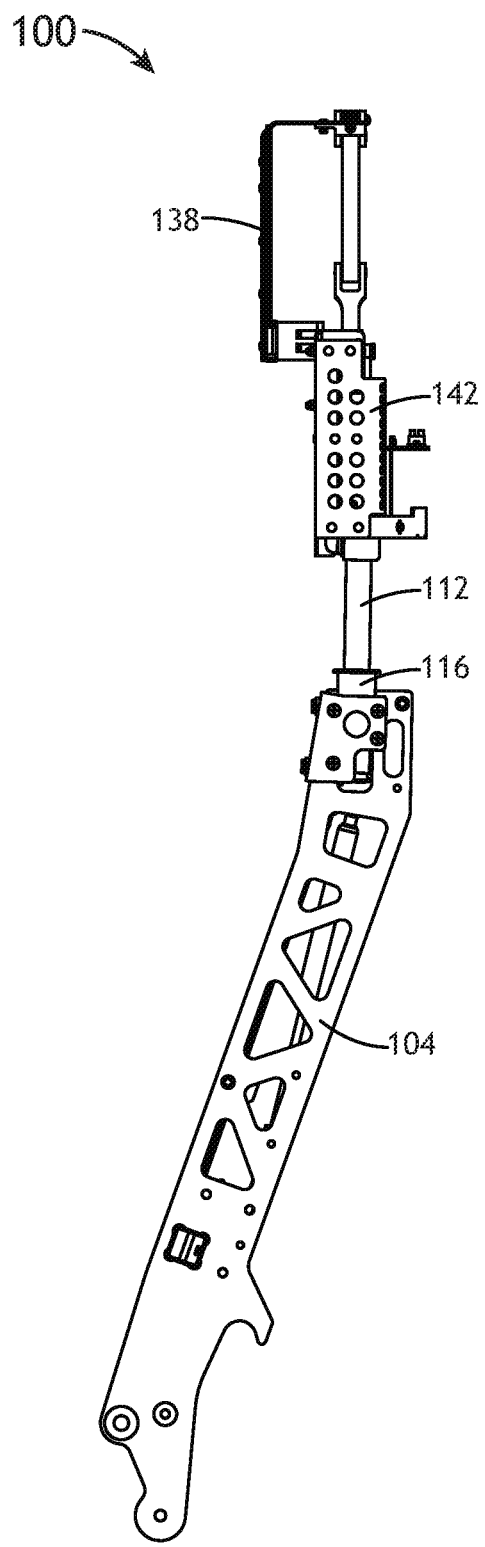
FIG. 2 is a side view of a multi-stage seatback extension system for a passenger chair, wherein the multi-stage seatback extension system is in an extended configuration, in accordance with an example embodiment of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a multi-stage seatback extension system. Headrest or backrest extension assemblies may be required in some aircraft and other vehicles with shorter seat backrests in order to support the head, neck, and back of vehicle occupants. However, as headrest or backrest extension assemblies become larger, they often become heavier and increasingly difficult for vehicle occupants to move and adjust, particularly from a seated position. For instance, the force required to adjust heavy headrest or backrest extension assemblies may be awkward, difficult, or even impossible to achieve from a seated position. As such, embodiments of the inventive concepts disclosed herein may facilitate the movement of headrest and/or backrest extension assemblies for easier, smoother adjustment. In particular, a multi-stage seatback extension system that can be manipulated more easily than a single stage headrest or backrest extension assembly is disclosed.

In example implementations, the inventive concepts of the present disclosure may be incorporated in the passenger chairs of an aircraft in order to facilitate the movement of the headrests and backrests of the passenger chairs. Using the inventive concepts disclosed herein, aircraft passengers may be able to quickly and easily adjust the headrests and backrests of their seats. Although example embodiments of the present disclosure are shown and described in an aviation environment, the inventive concepts of the present disclosure may be configured to operate in any type of chair and/or vehicle known in the art. For example, the embodiments of the present disclosure may be incorporated into the driver/passenger chairs of any air, land, or water-based personal equipment or vehicle; any air, land, or water-based commercial equipment or vehicle; any air, land, or water-based military equipment or vehicle known in the art. In another example, embodiments of the present disclosure may be incorporated into the driver/passenger chair of an automobile. In the interest of simplicity and to most clearly define the inventive concepts of the present disclosure, embodiments may be described throughout the present disclosure in an aircraft environment. However, these references are not to be regarded as limiting. Thus, references to "aircraft," "airplanes," "aviation," and like terms should not be interpreted as a limitation on the present disclosure, unless noted otherwise herein.

FIGS. 1 through 20 illustrate example embodiments of a multi-stage seatback extension system 100. For example, FIGS. 1 through 5 and 11 through 15 illustrate example embodiments of a multi-stage seatback extension system 100 is in an extended configuration for a wide passenger chair and a narrow passenger chair, respectively; and FIGS. 6 through 10 and 16 through 20 illustrate example embodiments of the multi-stage seatback extension system 100 is in a fully retracted/stowed configuration for a wide passenger chair and a narrow passenger chair, respectively.

Referring generally to FIGS. 1 through 20, the multi-stage seatback extension system 100 includes a backrest base assembly 104, an extendable backrest assembly 142, and an extendable headrest assembly 138. The extendable backrest assembly 142 is moveably coupled to the backrest base assembly 104 such that it can be pulled away from the backrest base assembly 104 or pushed toward the backrest base assembly 104.

The extendable headrest assembly 138 is coupled to the extendable backrest assembly 142 so that the headrest assembly 138 can also be extended (or retracted). In this regard, the extendable backrest assembly 142 and the headrest assembly 138 implement a multi-stage (e.g., two stage) seatback extension system 100 that can be manipulated more easily than a single stage headrest or backrest extension assembly. For example, a user can raise the extendable backrest assembly 142 to a desired height and then raise the extendable headrest assembly 138 to a desired height, or only raise one of the extendable backrest assembly 142 or the extendable headrest assembly 138 to a desired height while keeping the other in a retracted/stowed configuration.

In some embodiments, the extendable backrest assembly 142 is moveably coupled to the backrest base assembly 104 by a plurality of extension members 112 coupled to the extendable backrest assembly 142 and a plurality of ports 116 on the backrest base assembly 104 that are configured to receive the extension members 112. For example, respective ones of the extension members 112 can be configured to slide within respective ones of the ports 116. The extension members 112 may be infinitely positionable within the ports 116. For example, the extension members 112 can be slid up or down within the ports 116 to any desired position within the range of motion allowed by structural interface between the backrest base assembly 104 and extendable backrest assembly 142. This may provide for greater flexibility in adjusting the position of the extendable backrest assembly 142. In some embodiments, the ports 116 may include a gasket material and/or may be appropriately dimensioned so that the extension members 112 are tightly held within the ports 116 so that the position of the extendable backrest assembly 142 is maintained until a user force that exceeds a predetermined threshold is applied to raise or lower the extendable backrest assembly 142.

While the extendable backrest assembly 142 is depicted as being movably coupled to the backrest base assembly 104 via one or more extension members 112 that are received in respective ports 116, in other embodiments, the extendable backrest assembly 142 may be movably coupled to the backrest base assembly 104 via extension members 112 configured to ride on respective tracks, or any other manner that allows for linear movement of the extendable backrest assembly 142 relative to the backrest base assembly 104.

Figure 3:
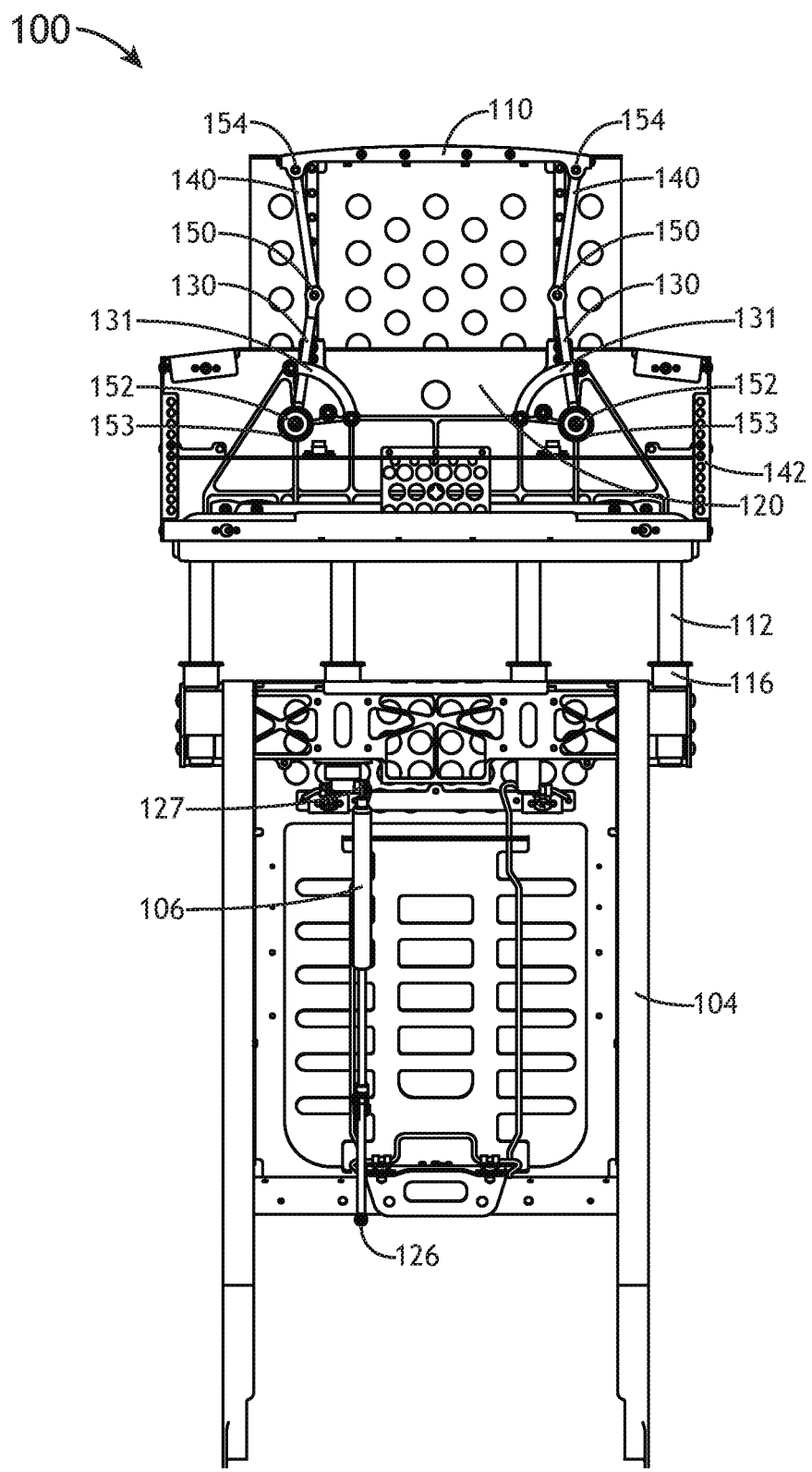
FIG. 3 is a rear view of a multi-stage seatback extension system for a passenger chair, wherein the multi-stage seatback extension system is in an extended configuration, in accordance with an example embodiment of this disclosure.
Figure 4:
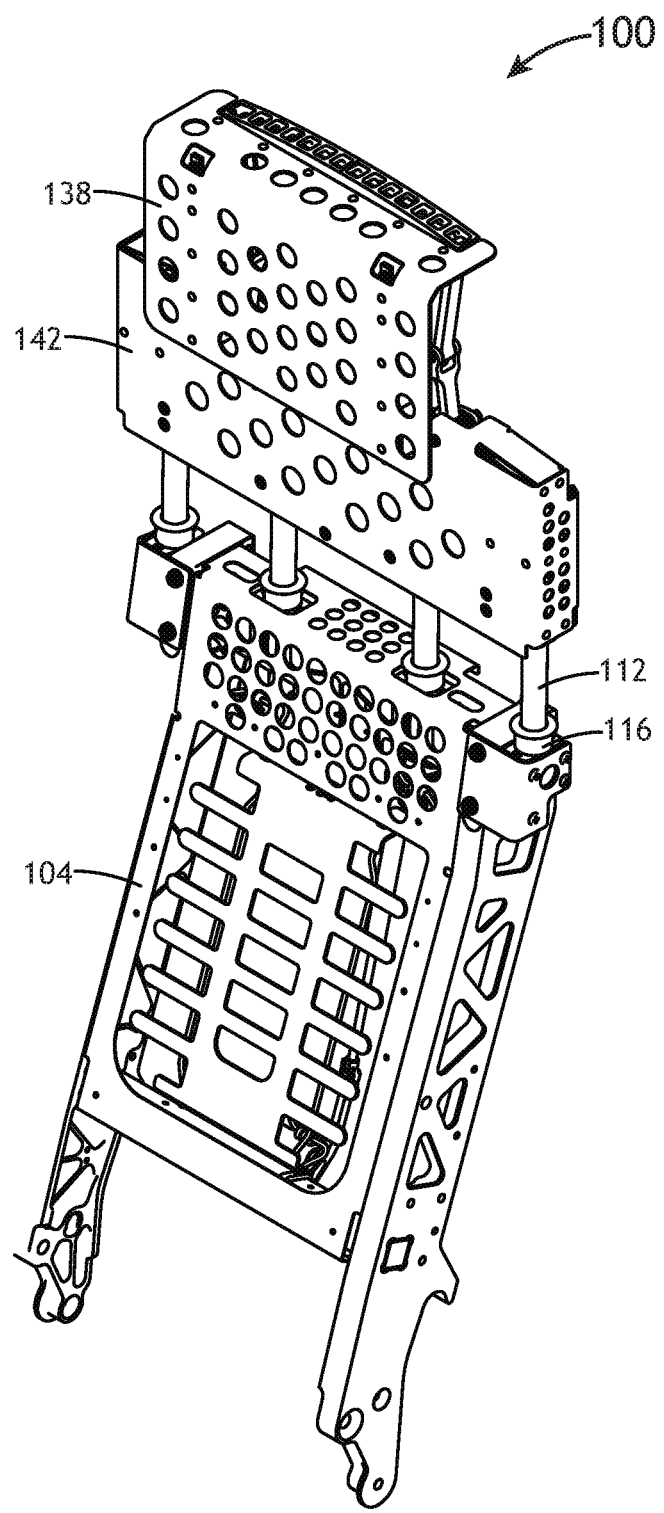
FIG. 4 is a perspective view of a front of a multi-stage seatback extension system for a passenger chair, wherein the multi-stage seatback extension system is in an extended configuration, in accordance with an example embodiment of this disclosure.
Figure 5:
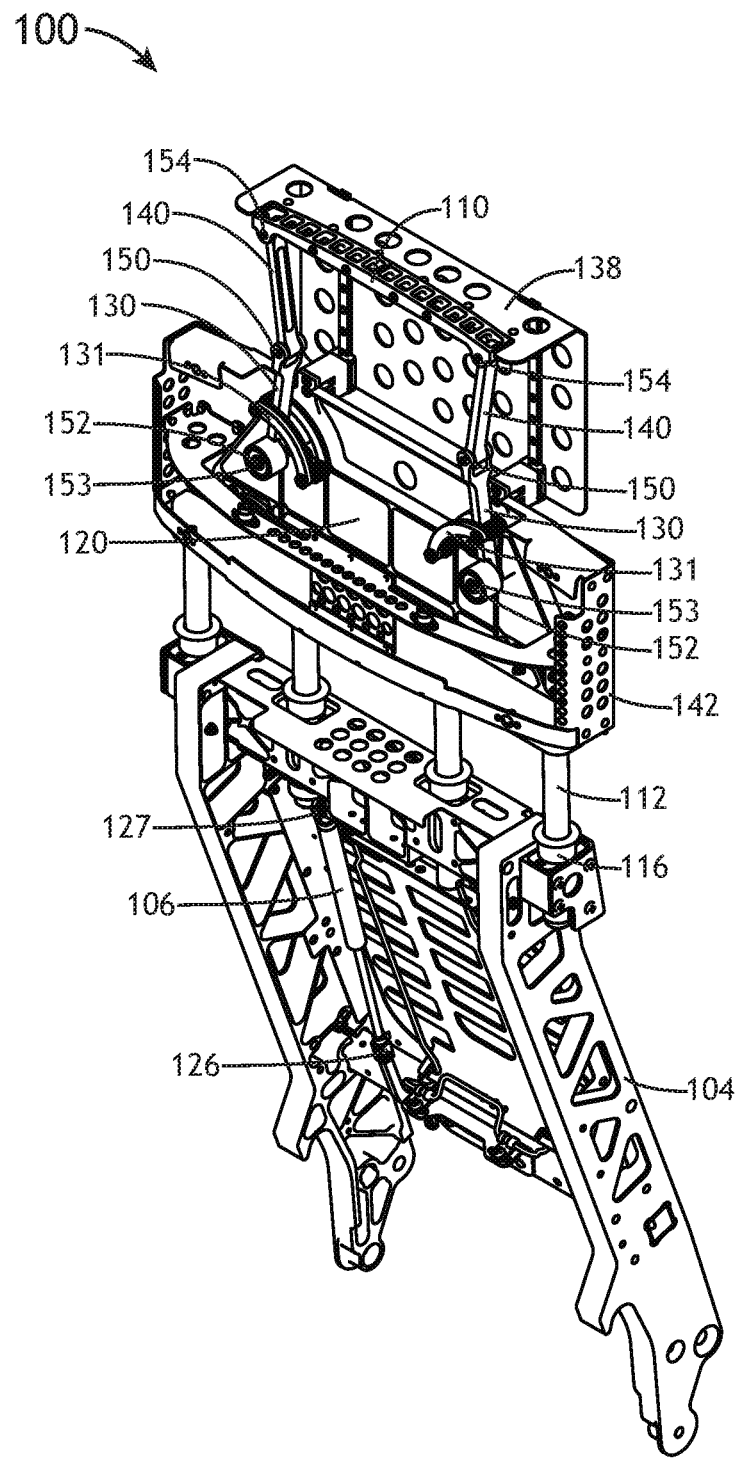
FIG. 5 is a perspective view of a rear of a multi-stage seatback extension system for a passenger chair, wherein the multi-stage seatback extension system is in an extended configuration, in accordance with an example embodiment of this disclosure.
Figure 6:
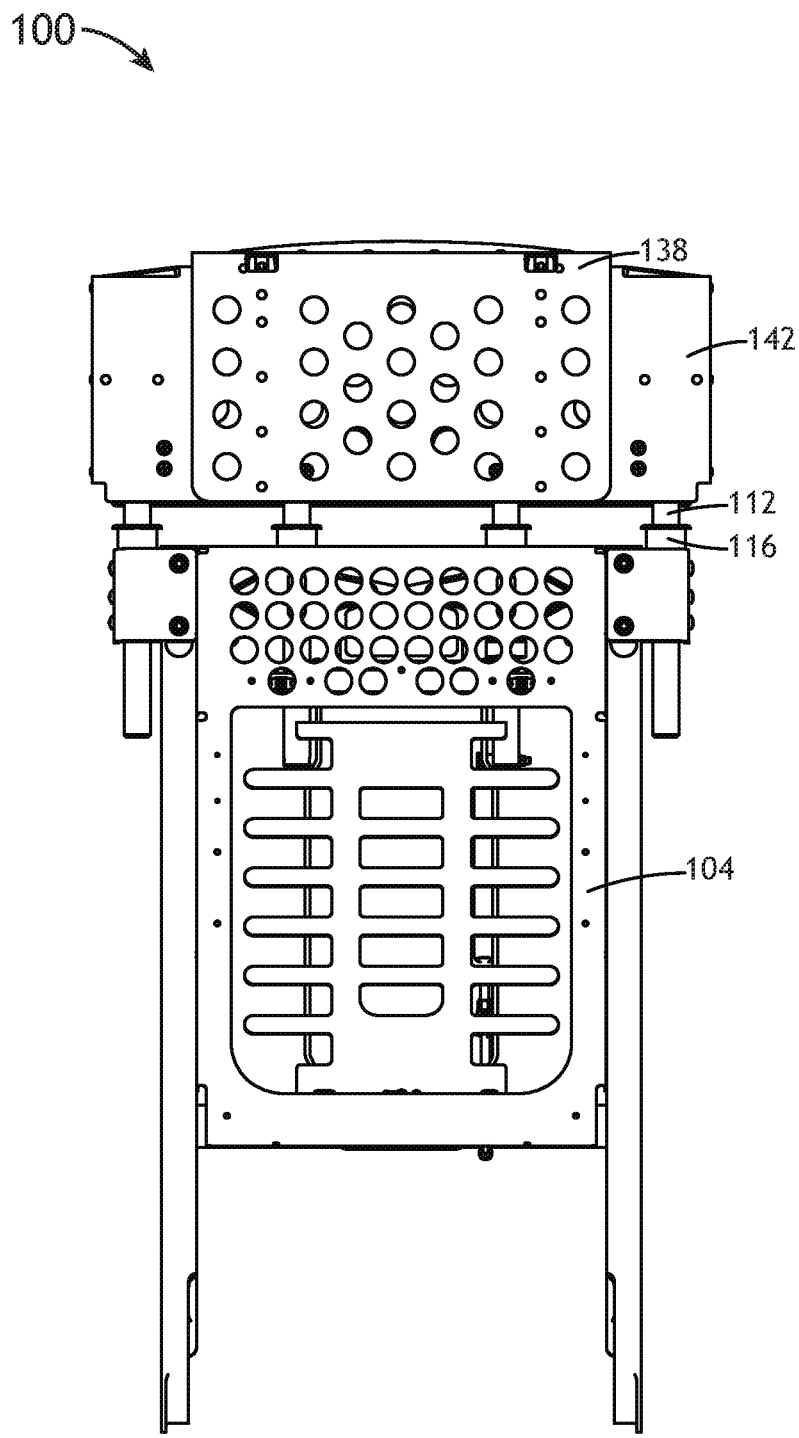
FIG. 6 is a front view of a multi-stage seatback extension system for a passenger chair, wherein the multi-stage seatback extension system is in a stowed configuration, in accordance with an example embodiment of this disclosure.
Figure 7:
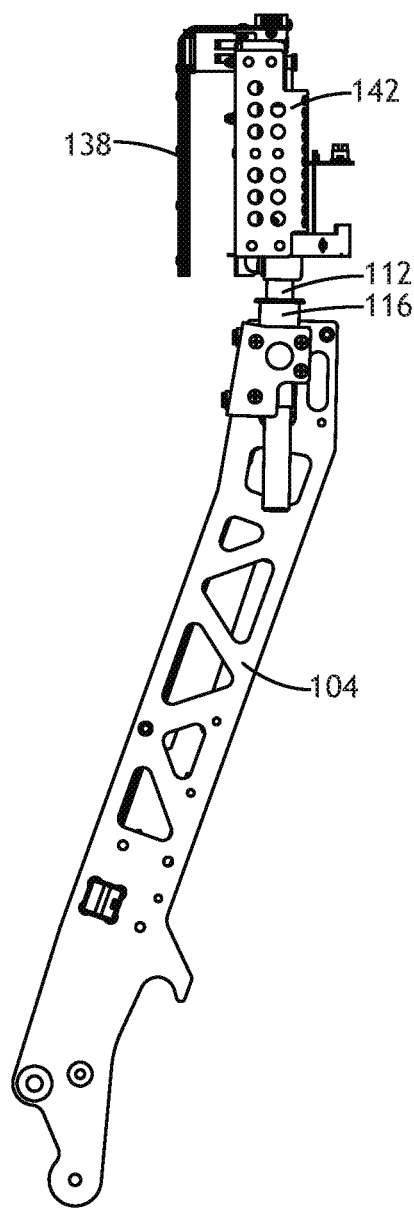
FIG. 7 is a side view of a multi-stage seatback extension system for a passenger chair, wherein the multi-stage seatback extension system is in a stowed configuration, in accordance with an example embodiment of this disclosure.
Figure 8:
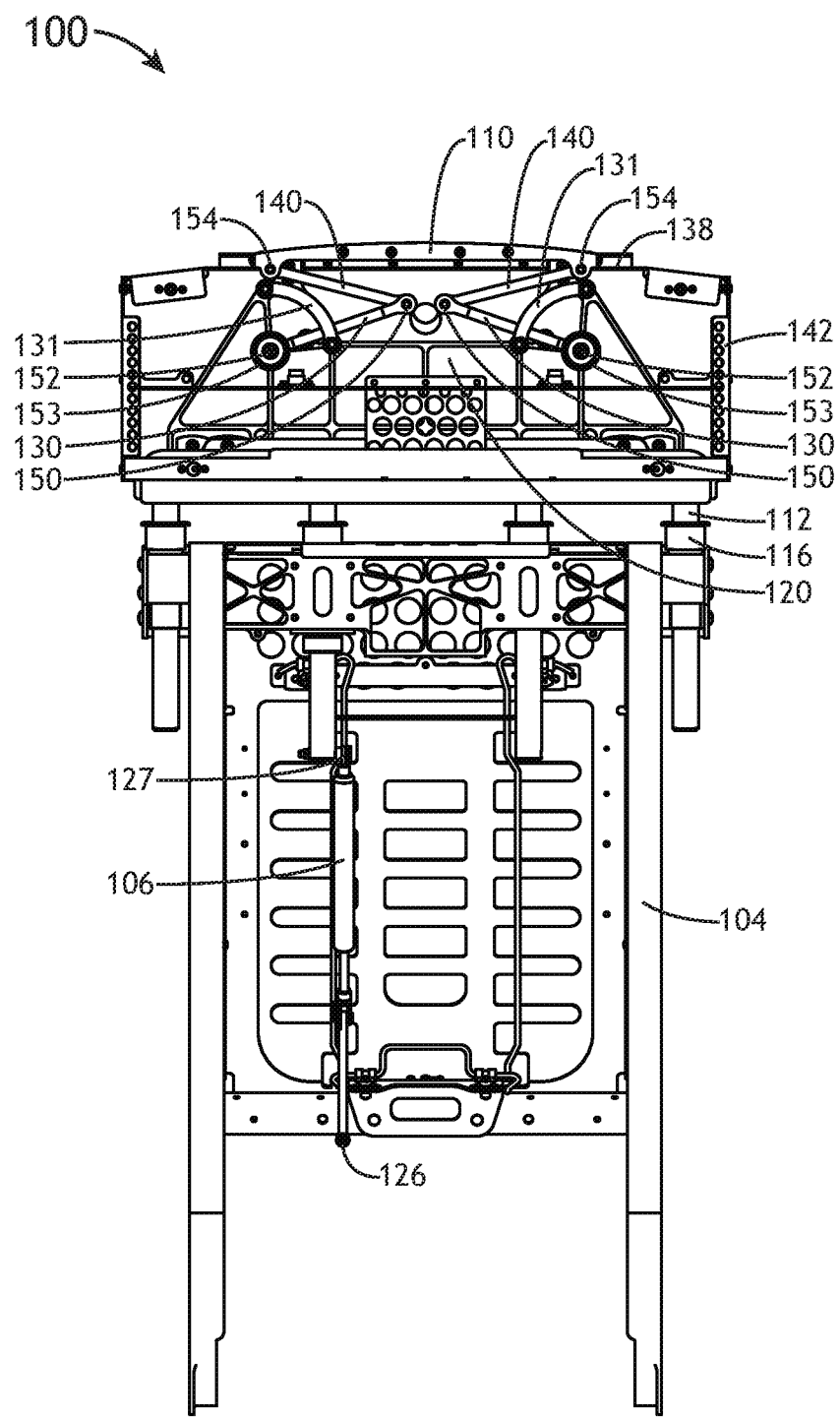
FIG. 8 is a rear view of a multi-stage seatback extension system for a passenger chair, wherein the multi-stage seatback extension system is in a stowed configuration, in accordance with an example embodiment of this disclosure.
Figure 9:
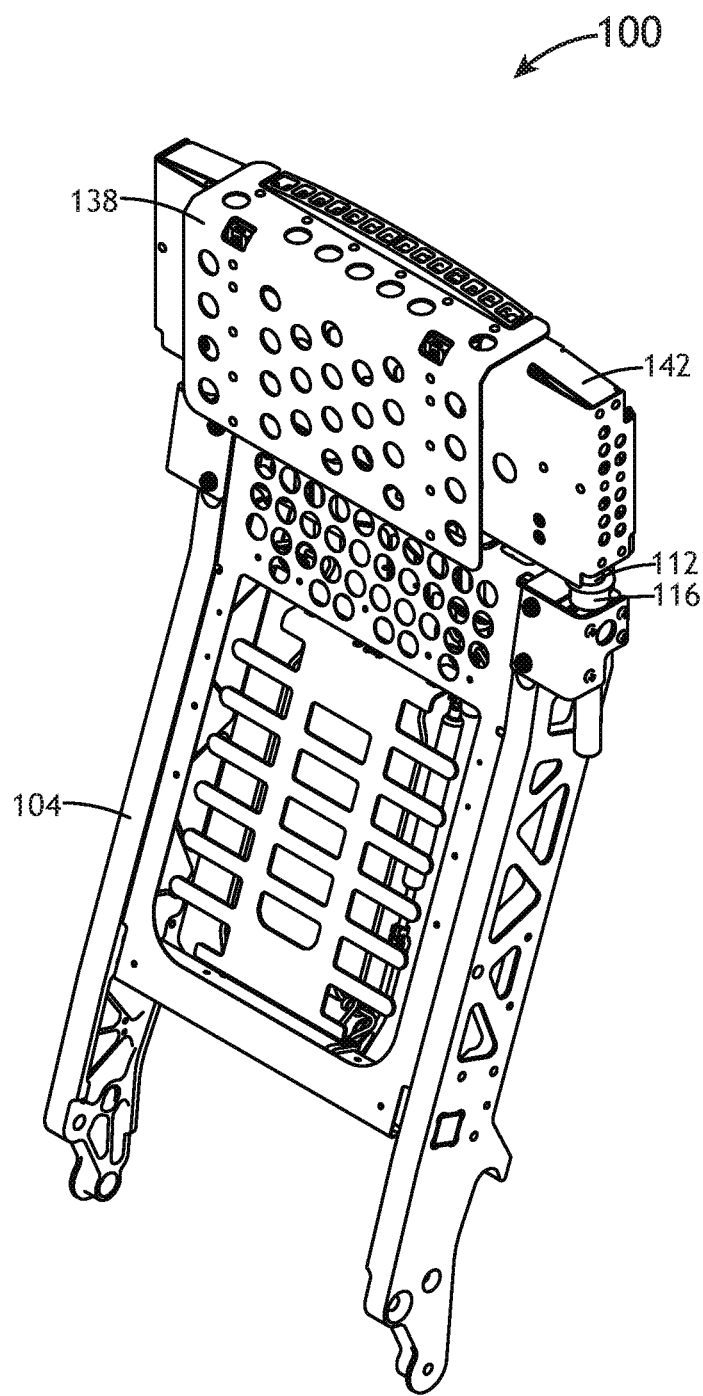
FIG. 9 is a perspective view of a front of a multi-stage seatback extension system for a passenger chair, wherein the multi-stage seatback extension system is in a stowed configuration, in accordance with an example embodiment of this disclosure.
Figure 10:
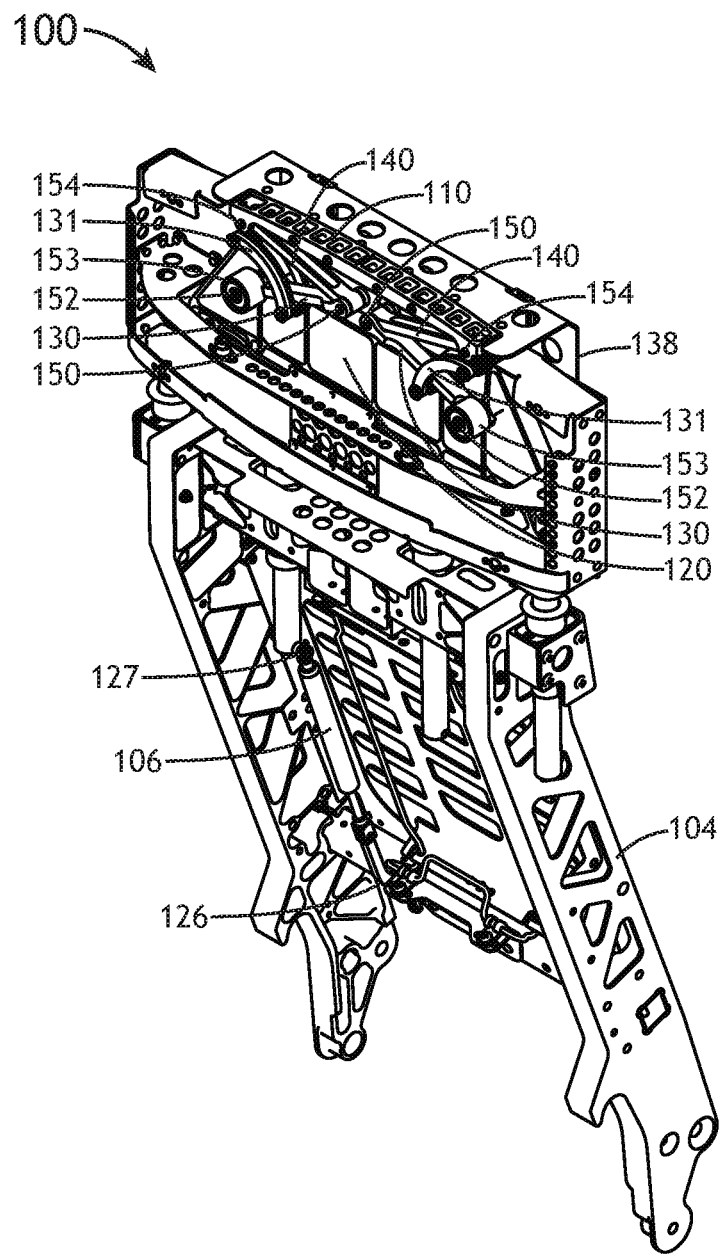
FIG. 10 is a perspective view of a rear of a multi-stage seatback extension system for a passenger chair, wherein the multi-stage seatback extension system is in a stowed configuration, in accordance with an example embodiment of this disclosure.
Figure 11:
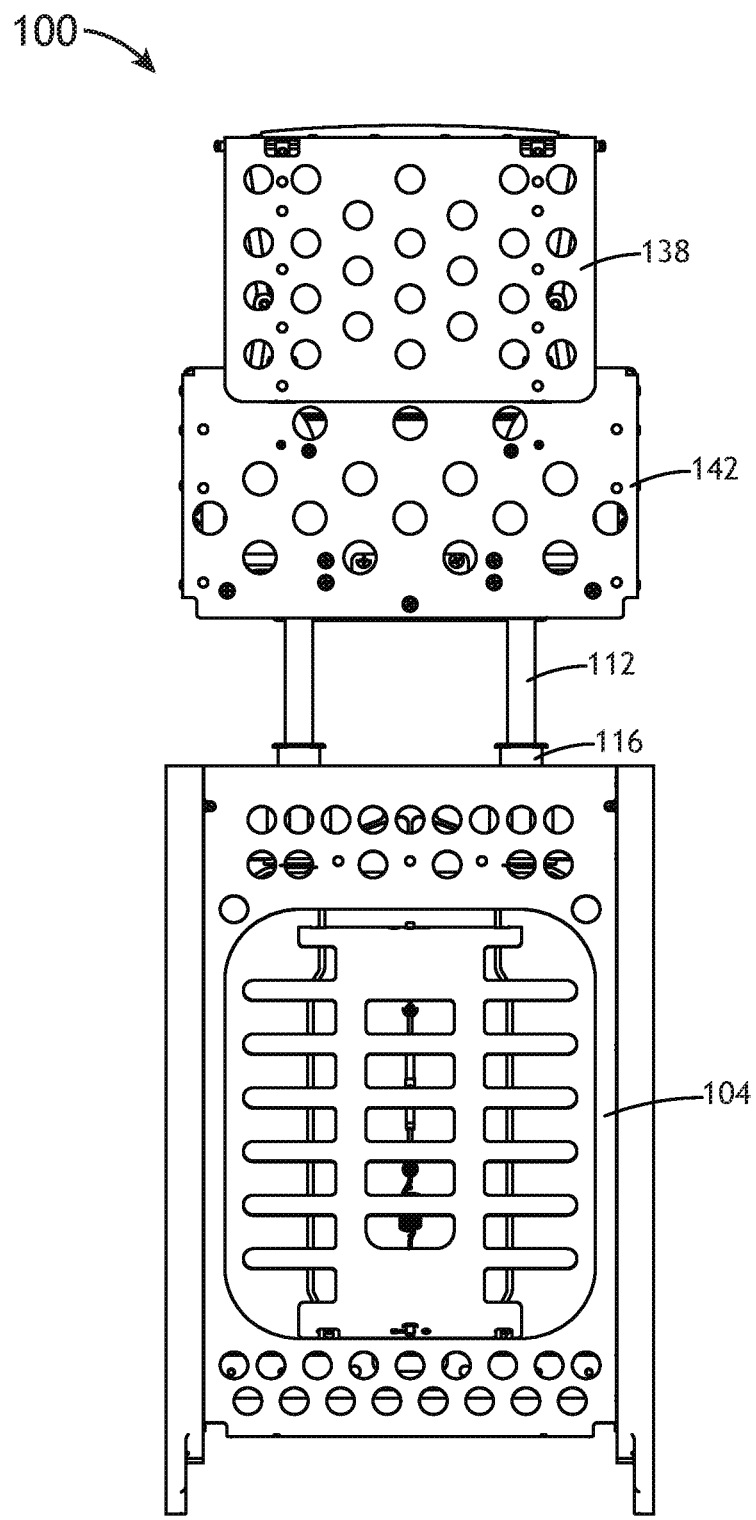
FIG. 11 is a front view of a multi-stage seatback extension system for a passenger chair, wherein the multi-stage seatback extension system is in an extended configuration, in accordance with an example embodiment of this disclosure.
Figure 12:
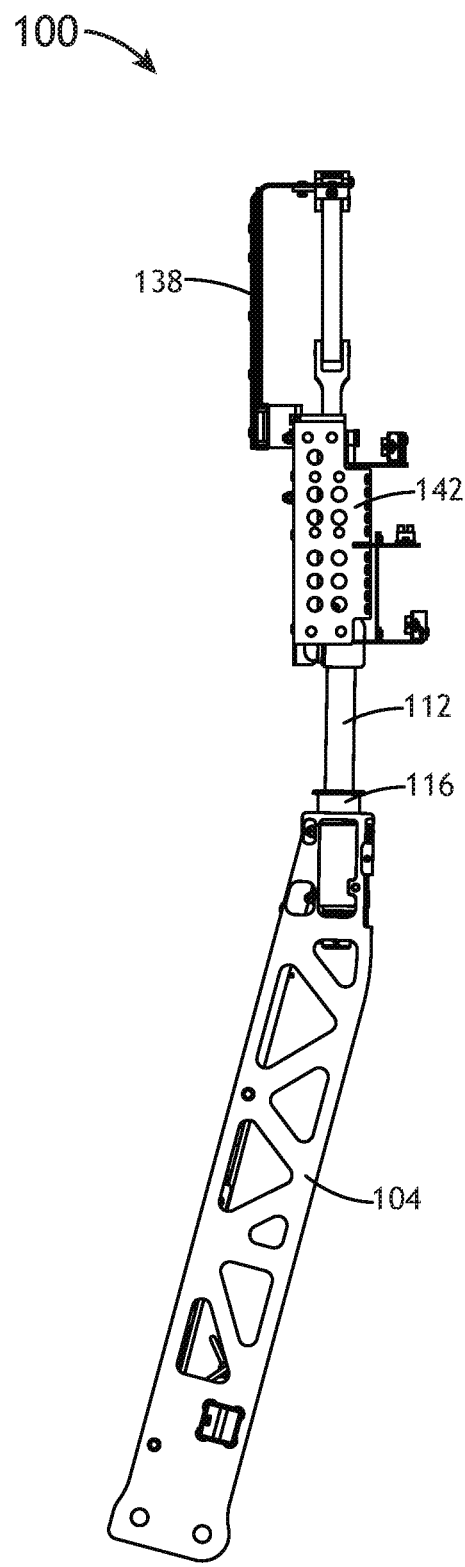
FIG. 12 is a side view of a multi-stage seatback extension system for a passenger chair, wherein the multi-stage seatback extension system is in an extended configuration, in accordance with an example embodiment of this disclosure.
Figure 13:
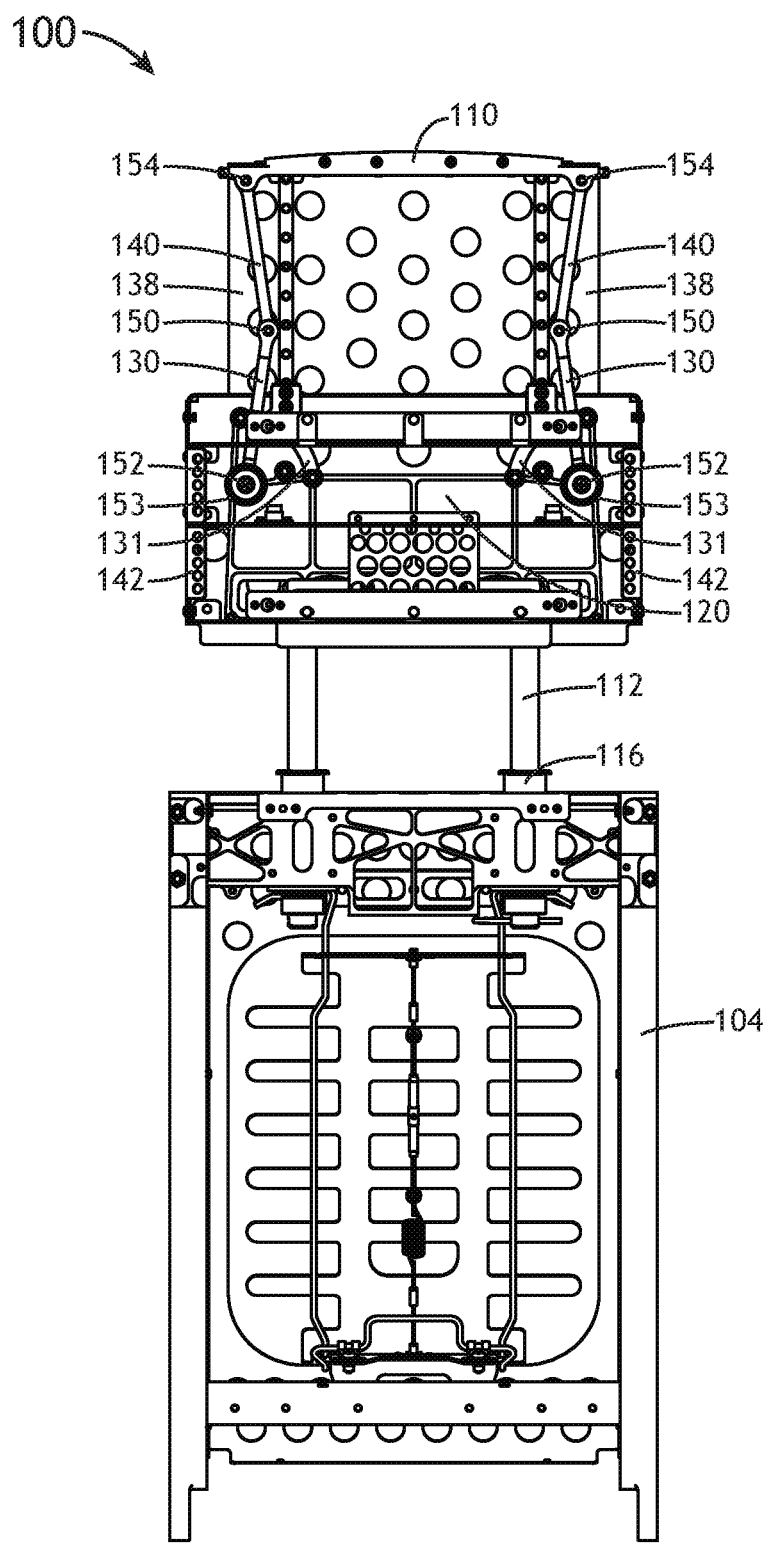
FIG. 13 is a rear view of a multi-stage seatback extension system for a passenger chair, wherein the multi-stage seatback extension system is in an extended configuration, in accordance with an example embodiment of this disclosure.
Figure 14:
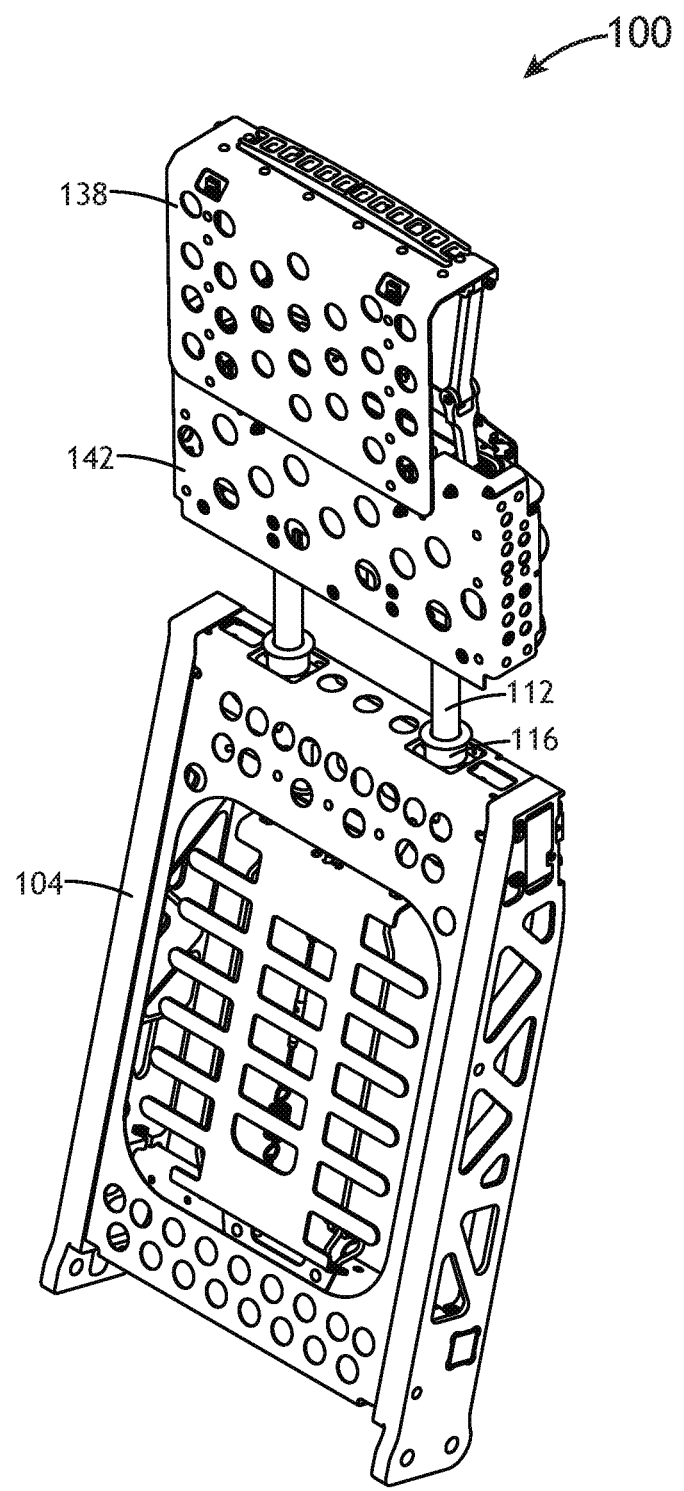
FIG. 14 is a perspective view of a front of a multi-stage seatback extension system for a passenger chair, wherein the multi-stage seatback extension system is in an extended configuration, in accordance with an example embodiment of this disclosure.
Figure 15:
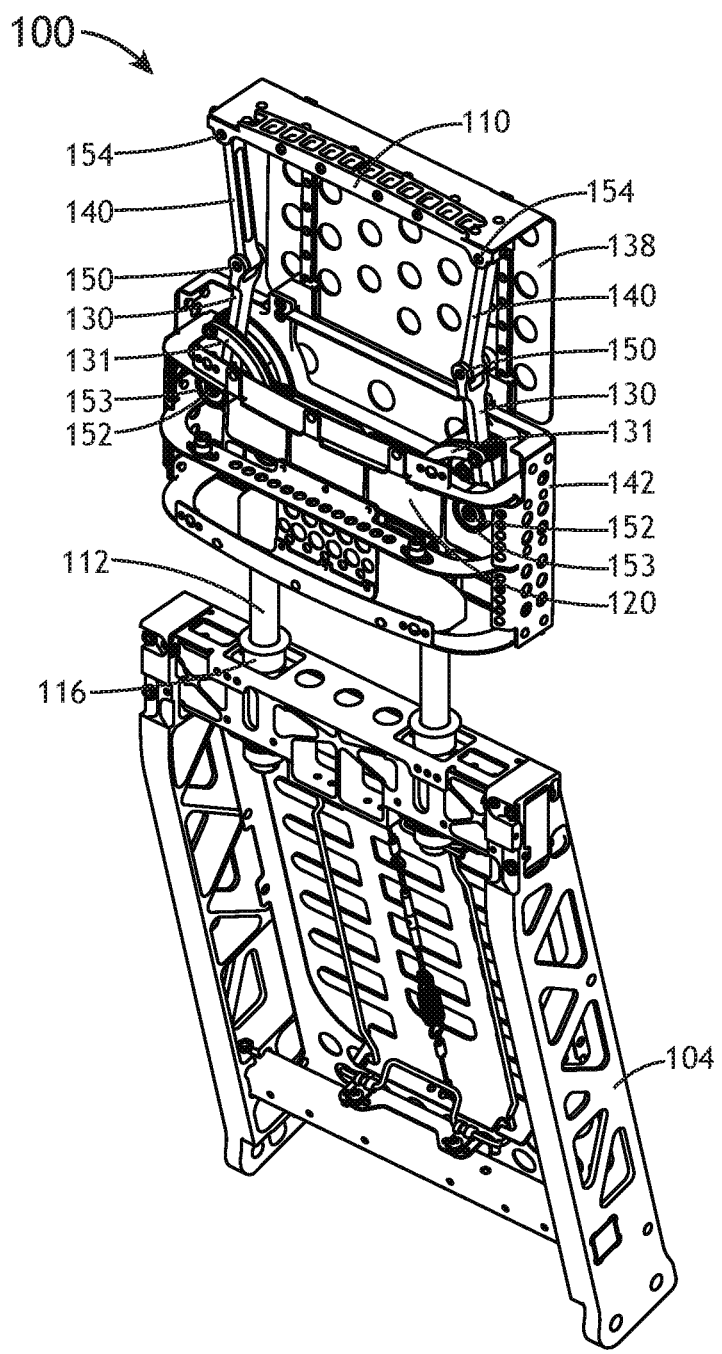
FIG. 15 is a perspective view of a rear of a multi-stage seatback extension system for a passenger chair, wherein the multi-stage seatback extension system is in an extended configuration, in accordance with an example embodiment of this disclosure.
Figure 16:
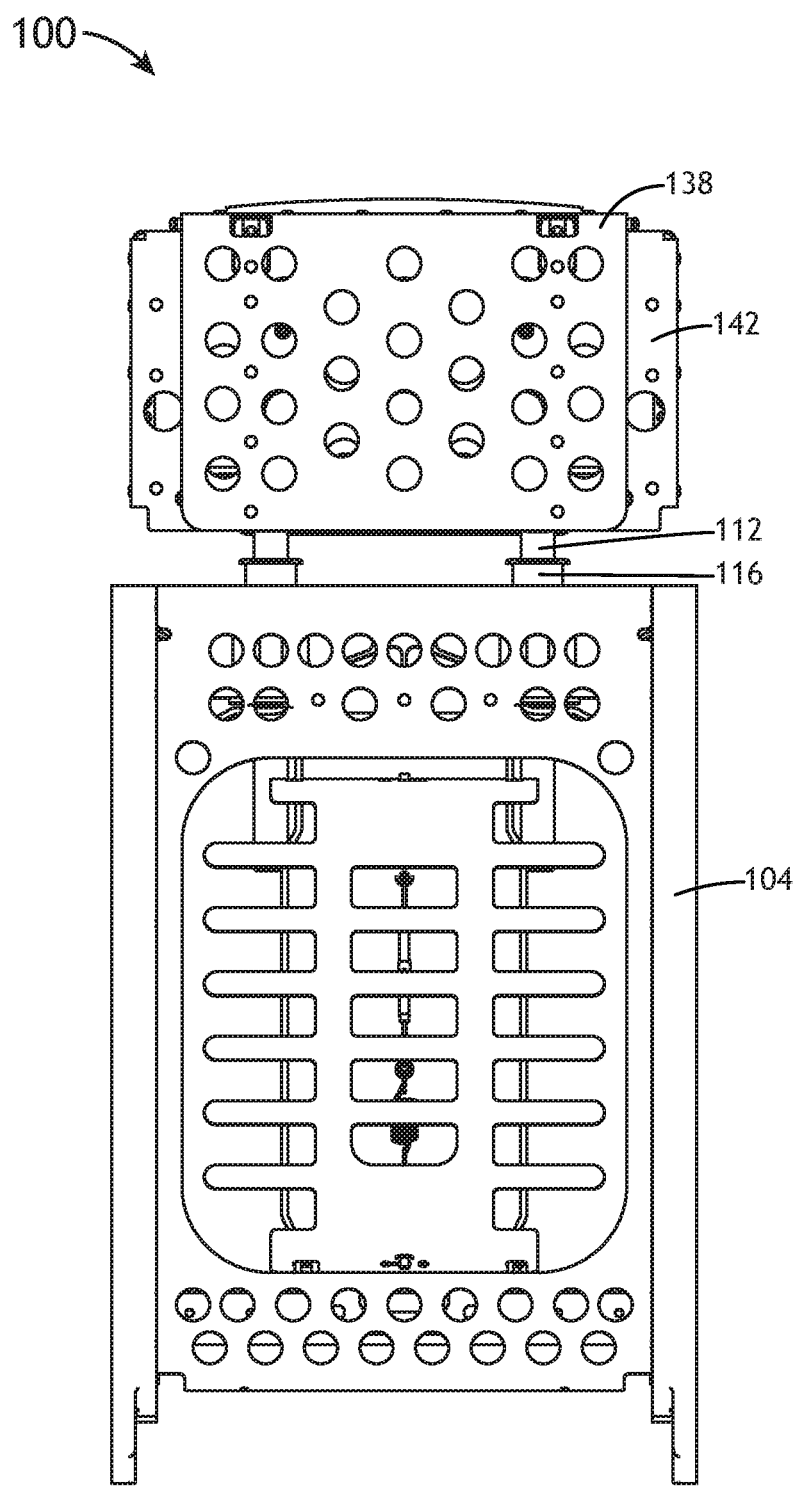
FIG. 16 is a front view of a multi-stage seatback extension system for a passenger chair, wherein the multi-stage seatback extension system is in a stowed configuration, in accordance with an example embodiment of this disclosure.
Figure 17:
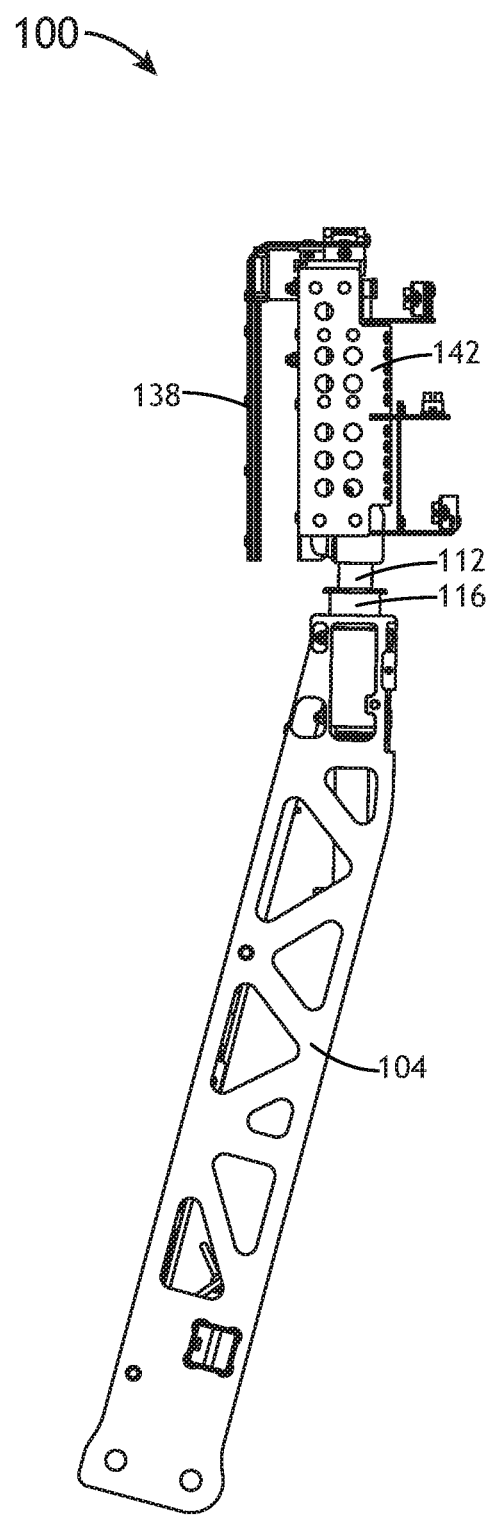
FIG. 17 is a side view of a multi-stage seatback extension system for a passenger chair, wherein the multi-stage seatback extension system is in a stowed configuration, in accordance with an example embodiment of this disclosure.
Figure 18:
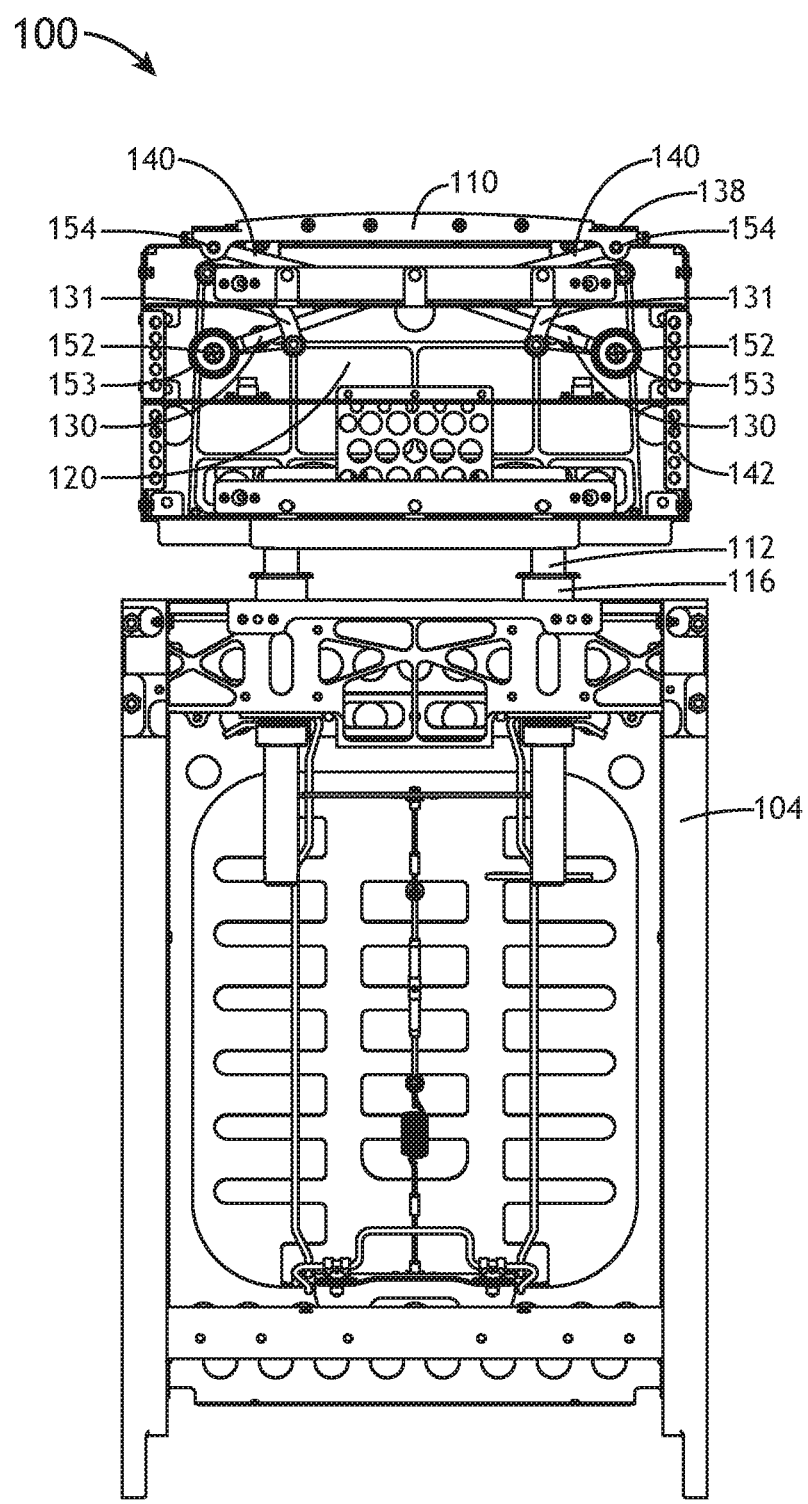
FIG. 18 is a rear view of a multi-stage seatback extension system for a passenger chair, wherein the multi-stage seatback extension system is in a stowed configuration, in accordance with an example embodiment of this disclosure.
Figure 19:
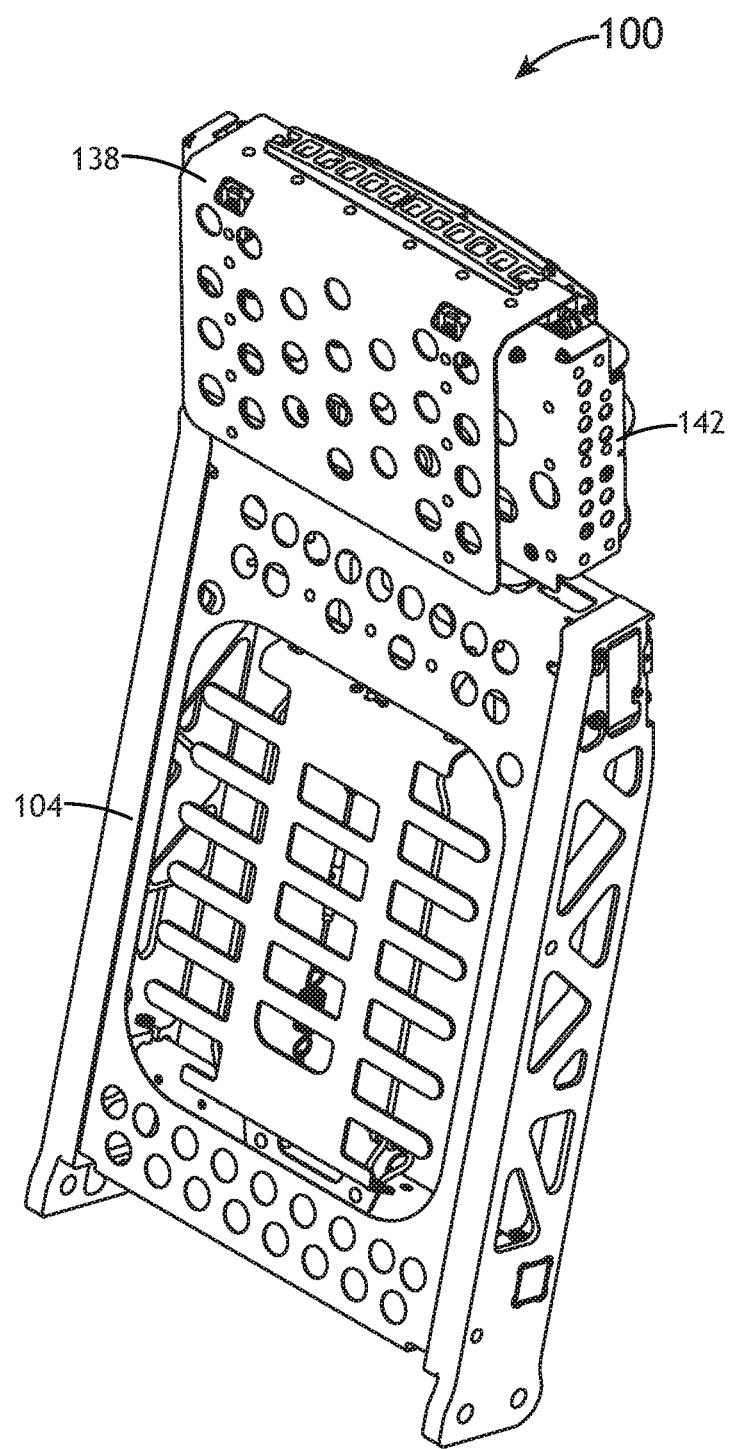
FIG. 19 is a perspective view of a front of a multi-stage seatback extension system for a passenger chair, wherein the multi-stage seatback extension system is in a stowed configuration, in accordance with an example embodiment of this disclosure.
Figure 20:
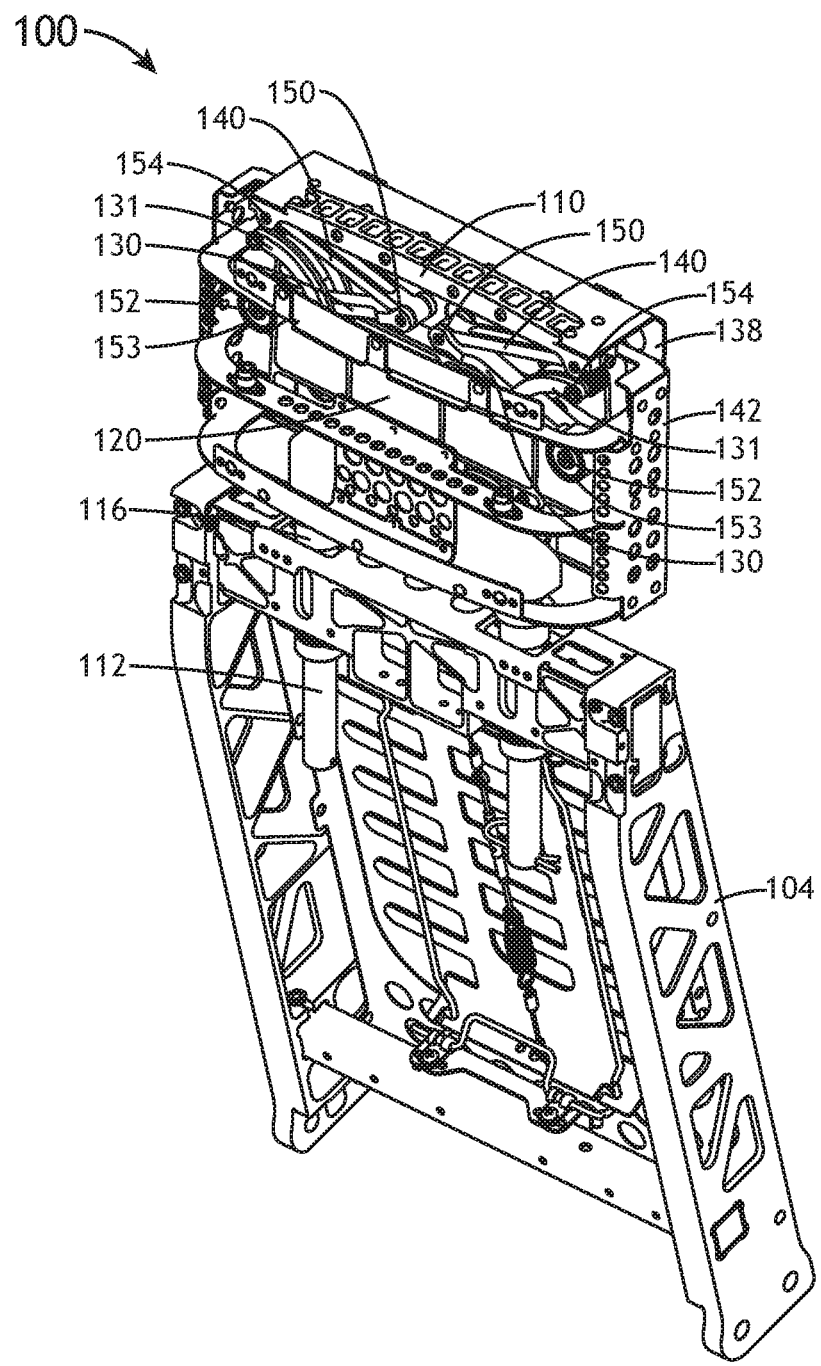
FIG. 20 is a perspective view of a rear of a multi-stage seatback extension system for a passenger chair, wherein the multi-stage seatback extension system is in a stowed configuration, in accordance with an example embodiment of this disclosure.

As shown in FIG. 3, in embodiments, the multi-stage seatback extension system 100 may further include an extension assist assembly 106 configured to apply an assistive force for raising the extendable backrest assembly 142, which may be quite heavy in some embodiments. The one or more extension members 112 may be coupled to the extension assist assembly 106. The extension assist assembly 106 can include any extension apparatus configured to assert an extension force (or a component of an extension force) in a direction for raising the extendable backrest assembly 142 (e.g., upward or substantially upward). For example, the extension assist assembly 106 may include a gas spring, a gas strut, or a mechanical strut. In some embodiments, the extension assist assembly 106 includes a damper configured to control the speed at which the extendable backrest assembly 142 is raised or lowered.

In some embodiments, the one or more extension members 112 may be coupled to the extension assist assembly 106 at an attachment point 127 by one or more fasteners. Similarly, the extension assist assembly 106 may be coupled to the backrest base assembly 104 at an attachment point 126 by one or more fasteners. The fasteners may include, but are not limited to, one or more rivets, one or more screws, one or more nuts/bolts, one or more pins (e.g., hitch and pin, cotter pin, split pin, locking pin), one or more clamps, one or more adhesives, one or more welded joints, one or more snaps, any combination thereof, or the like. In some embodiments, the extension assist assembly 106 is coupled to a mounting bracket affixed to the backrest base assembly 104 and/or a mounting bracket affixed to one or more extension members 112.

Although the extension assist assembly 106 is illustrated as attaching to an attachment point 126 fixed to the backrest base assembly 104, this is not to be regarded as a limitation of the present disclosure. The extension assist assembly 106 may be coupled to an attachment point 126 which is stationary with respect to the extendable backrest assembly 142. For example, the extension assist assembly 106 may be coupled to an attachment point 126 which is located on the floor upon which the seat and backrest base assembly 104 are situated. In another example, the extension assist assembly 106 may be coupled to an attachment point 126 which is located on a mounting bracket which extends from the floor. In this regard, the extension assist assembly 106 may be coupled to any fixed point relative to the extendable backrest assembly 142.

The extension assist assembly 106 may be configured to exert an extension force (or a component of an extension force) upon the extendable backrest assembly 142. The extension force exerted by the extension assist assembly 106 may offset, or partially offset, an extension resistance force which acts in an opposite direction to the extension force. For example, gravity may act as an extension resistance force, pulling the extendable backrest assembly 142 down. Conversely, the extension assist assembly 106 may exert an extension force upward such that it offsets, or partially offsets, the force of gravity acting upon the mass of the extendable backrest assembly 142. Offsetting, or partially offsetting, the extension resistance force may allow a user to raise the extendable backrest assembly 142 with less force, thereby providing a smoother, more luxurious experience.

The extension force exerted by the extension assist assembly 106 may be based on a number of factors including, but not limited to, the force desired to extend the extendable backrest assembly 142, and the magnitude of the extension resistance force, which may be affected by the mass of the extendable backrest assembly 142, forces of friction, and the like. Accordingly, system 100 and extension assist assembly 106 may be tailored on a bespoke basis dependent on any number of factors including, but not limited to, the type of aircraft, particular passengers, desired flying experience, need for adjustability, frequency of adjustments, and the like. For example, the extension assist assembly 106 may be tailored such that the extension force is between two and five pounds less than the extension resistance force, such that only two to five pounds of force is required to extend the headrest extension assembly 102 from a retracted position to an intermediate or extended position.

As noted previously herein, the extension assist assembly 106 may include a gas spring. In embodiments, the extension assist assembly 106 (e.g., gas spring) may be loaded in compression, or may be loaded in extension. In some embodiments, a first end of the extension assist assembly 106 may be coupled to an extension member 112. A second end of the extension assist assembly 106 may be coupled to the backrest base assembly 104 at an attachment point 126 located on the backrest base assembly 104 substantially opposite the extendable backrest assembly 142. In such embodiments, when the extension assist assembly 106 is in a contracted/retracted state, the extendable backrest assembly 142 may also be in a retracted position (e.g., stowed position), as shown in FIGS. 6 through 10. Conversely, as shown in FIGS. 1 through 5, when the extension assist assembly 106 is in an extended state, the extendable backrest assembly 142 may also be in an extended state (e.g., raised/pulled away from the backrest base assembly 104). The extension assist assembly 106, loaded in compression, may resist compression such that it exerts an extension force (upward) to assist with raising the extendable backrest assembly 142.

In other embodiments, the extension assist assembly 106 (e.g., gas spring) may be loaded in extension. In such embodiments, a first end of the extension assist assembly 106 may be coupled to an extension member 112, and a second end of the extension assist assembly 106 is coupled to the backrest base assembly 104 at attachment point which is located on the backrest base assembly 104 at a point which is proximate to the extendable backrest assembly 142 and/or one or more ports 106. Consequently, when the extension assist assembly 106 is in an extended state, the extendable backrest assembly 142 may be in a retracted position (e.g., stowed position). Conversely, when the extension assist assembly 106 is in a retracted state, the extendable backrest assembly 142 may be in an extended state. The extension assist assembly 106, loaded in extension, may resist extension such that it exerts an extension force (upward) to assist with raising the extendable backrest assembly 142. Embodiments of the extension assist assembly 106, which can be loaded in compression or extension, are further described in U.S. patent application Ser. No. 16/128,749, which is incorporated herein by reference in its entirety. The multi-stage seatback extension system 100 can include any such embodiment; however, in other embodiments, the multi-stage seatback extension system 100 may be implemented without an extension assist assembly (e.g., as shown in FIGS. 11 through 20).

Referring again to FIGS. 3 and 13, the extendable headrest assembly 138 may include a stationary member 120 coupled to the extendable backrest assembly 142, a moveable cross member 110, at least two lower links 130, and at least two upper links 140. The lower links 130 may be rotationally coupled to respective lower pivot joints 152 of the stationary member 120, and the upper links 140 may be rotationally coupled to respective upper pivot joints 154 of the moveable cross member 110. Respective ones of the lower links 130 can be coupled to respective ones of the upper links 140 by respective link pivot joints 150. The links 130 and 140 can rotate toward a center of the headrest assembly 138 or away from the center of the headrest assembly 138 to respectively retract or extend the headrest assembly 138. For example, when the headrest assembly 138 is retracted by lowering the moveable cross member 110, the links 130 and 140 rotate toward the center of the headrest assembly 138 such that the lower links 130 and the upper links 140 are brought closer to each other. Conversely, when the headrest assembly 138 is extended by raising the moveable cross member 110, the links 130 and 140 rotate away from the center of the headrest assembly 138 links such that the lower links 130 and the upper links 140 are spread apart from each other.

In some embodiments, the headrest assembly 138 includes at least one motion restrictor 131 configured to limit a rotational movement of at least one of the links 130/140. For example, in FIGS. 3 and 13, the headrest assembly 138 is shown to include motion restrictors 131 that limit the rotational movement of the lower links 130. In other embodiments, one or more motion restrictors 131 can additionally or alternatively limit the rotational movement of at least one of the upper links 140. In embodiments, a motion restrictor 131 can include an arc-shaped member with blocking elements on either end to limit the rotational movement of a respective link 130/140 to the arc-length defined by the motion restrictor 131. Any number of motion-restrictors 131 may be employed, and the shape of the motion restrictors 131 may differ. For example, in another embodiment, a motion restrictor 131 may simply include one or more blocking elements that limit the rotation movement of a respective link 130/140.

The headrest assembly 138 may further include one or more dampers 153 coupled to one or more of the lower links 130, the upper links 140, the lower pivot joints 152 of the stationary member 120, the upper pivot joints 154 of the moveable cross member 110, or the link pivot joints 150. For example, in FIGS. 3 and 13, the headrest assembly 138 is shown to include rotary dampers 153 coupled to the lower pivot joints 152 of the stationary member 120. In other embodiments, rotary dampers 153 can additionally or alternatively be coupled to one or more of the upper pivot joints 154 and/or the link pivot joints 150. Furthermore, the one or more dampers 153 can include other types of dampers, such as, but not limited to, a gas spring damper, a mechanical spring damper, or the like. Examples of different types of dampers 153 and additional embodiments of the headrest assembly 138 (e.g., extension/retraction systems) are further described in U.S. patent application Ser. No. 16/128,773, which is incorporated herein by reference in its entirety. The multi-stage seatback extension system 100 can include any such embodiment.

In embodiments, the multi-stage seatback extension system 100 includes both an extendable headrest assembly 138 and an extendable backrest assembly 142 that can be adjusted up or down with infinite position (i.e., to any position allowed by each component's range of motion). In some embodiments, the translation of any of the stages may be driven by a powered actuator to either extend the tubes/extension members 112 and/or links 130 and/or 140 (e.g. linear actuator or a rotary actuator with gears around the lower link pivot 152).

The extendable backrest assembly 142 can be raised or lowered to any appropriate position for providing back and shoulder support for an occupant. In some embodiments, the extendable backrest assembly 142 can be extended up to four inches from the backrest base assembly 104. In other embodiments, the extendable backrest assembly 142 may have a greater or lesser range of motion. Similarly, the extendable headrest 138 can be raised or lowered to any appropriate position for providing neck and head support. In some embodiments, the extendable headrest assembly 138 can be extended up to four inches from the extendable backrest assembly 142. In other embodiments, the extendable headrest assembly 138 may have a greater or lesser range of motion. The multi-stage seatback extension system 100, when fully extended, may achieve occupant support in the range of 35 to 40 inches (e.g., 36.5 inches). In other embodiments, the multi-stage seatback extension system 100 achieves occupant support in a greater or lesser range when fully extended.

The multi-stage seatback extension system 100 can be configured according to the occupant protection requirements of FAA Policy ANM-113-02-036 for aft facing seats by limiting the vertical gap in the backrest support to less than 4 inches. The multi-stage seatback extension system 100 can also be configured according to the occupant protection requirements of FAA Policy ANM-113-02-036 by limiting the fore/aft offset of the head, neck, and shoulders. The multi-stage seatback extension system 100 can also be configured according to the occupant protection requirements of FAA Policy ANM-113-02-036 by limiting the dynamic deflection of the system to support the occupant under static and dynamic loading. The multi-stage seatback extension system 100 can also be configured according to the occupant support height requirements of SAE AS8049B for aft facing occupants to support a range of occupant heights with infinite adjustment. The multi-stage seatback extension system 100 may also limit injury potential in the thoracic and cervical spine regions by limiting deflection under dynamic (crash) loads as prescribed by 14 CFR 25.562.

The multi-stage seatback extension system 100 provides a unique backrest extension feature to react the dynamic loading of the occupant's shoulders while simultaneously maintaining support of the occupant's head during the event. The multi-stage seatback extension system 100 also utilizes a space-saving extension mechanism that allows for dampened extension and retraction of the headrest support portion.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or coupled with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A multi-stage seatback extension system, comprising:
   a backrest base assembly;
   an extendable backrest assembly moveably coupled to the backrest base assembly; and
   an extendable headrest assembly coupled to the extendable backrest assembly, wherein the extendable headrest assembly comprises:
   a stationary member coupled to the extendable backrest assembly;
   a movable cross member;
   at least two lower links rotationally coupled to respective lower pivot joints of the stationary member; and
   at least two upper links rotationally coupled to respective upper pivot joints of the moveable cross member, wherein respective ones of the at least two lower links are coupled to respective ones of the at least two upper links by respective link pivot joints.

2. The multi-stage seatback extension system of claim 1, further comprising:
   a plurality of extension members coupled to the extendable backrest assembly; and
   a plurality of ports on the backrest base assembly configured to receive the plurality of extension members, wherein respective ones of the plurality of extension members are configured to slide within respective ones of the plurality of ports.

3. The multi-stage seatback extension system of claim 2, further comprising:
   an extension assist assembly with a first end and a second end, the first end coupled to the one or more extension members and the second end coupled to a fixed point relative to the extendable backrest assembly.

4. The multi-stage seatback extension system of claim 3, wherein the extension assist assembly comprises a gas spring assembly.

5. The multi-stage seatback extension system of claim 3, wherein the extension assist assembly is loaded in compression and is configured to extend to translate the headrest extension assembly from a retracted position to an extended position.

6. The multi-stage seatback extension system of claim 3, wherein the extension assist assembly is loaded in extension and is configured to retract to translate the headrest extension assembly from a retracted position to an extended position.

7. The multi-stage seatback extension system of claim 1, further comprising one or more dampers coupled to one or more of: the at least two lower links, the at least two upper links, the respective lower pivot joints of the stationary member, the respective pivot joints of the moveable cross member, or the respective link pivot joints.

8. The multi-stage seatback extension system of claim 7, wherein the one or more dampers comprise one or more rotary dampers coupled to one or more of: the respective lower pivot joints of the stationary member, the respective pivot joints of the moveable cross member, or the respective link pivot joints.

9. The multi-stage seatback extension system of claim 1, further comprising:
   at least one motion restrictor configured to limit a rotational movement of at least one of the links.

10. A multi-stage seatback extension system, comprising:
    a backrest base assembly;
    an extendable backrest assembly moveably coupled to the backrest base assembly by a plurality of extension members coupled to the extendable backrest assembly and a plurality of ports on the backrest base assembly configured to receive the plurality of extension members, wherein respective ones of the plurality of extension members are configured to slide within respective ones of the plurality of ports; and
    an extendable headrest assembly coupled to the extendable backrest assembly, the extendable headrest assembly comprising:
    a stationary member coupled to the extendable backrest assembly;
    a movable cross member;
    at least two lower links rotationally coupled to respective lower pivot joints of the stationary member; and
    at least two upper links rotationally coupled to respective upper pivot joints of the moveable cross member, wherein respective ones of the at least two lower links are coupled to respective ones of the at least two upper links by respective link pivot joints.

11. The multi-stage seatback extension system of claim 10, further comprising:
    an extension assist assembly with a first end and a second end, the first end coupled to the one or more extension members and the second end coupled to a fixed point relative to the extendable backrest assembly.

12. The multi-stage seatback extension system of claim 11, wherein the extension assist assembly comprises a gas spring assembly.

13. The multi-stage seatback extension system of claim 11, wherein the extension assist assembly is loaded in compression and is configured to extend to translate the headrest extension assembly from a retracted position to an extended position.

14. The multi-stage seatback extension system of claim 11, wherein the extension assist assembly is loaded in extension and is configured to retract to translate the headrest extension assembly from a retracted position to an extended position.

15. The multi-stage seatback extension system of claim 10, further comprising one or more dampers coupled to one or more of: the at least two lower links, the at least two upper links, the respective lower pivot joints of the stationary member, the respective pivot joints of the moveable cross member, or the respective link pivot joints.

16. The multi-stage seatback extension system of claim 15, wherein the one or more dampers comprise one or more rotary dampers coupled to one or more of: the respective lower pivot joints of the stationary member, the respective pivot joints of the moveable cross member, or the respective link pivot joints.

17. The multi-stage seatback extension system of claim 15, further comprising:
 at least one motion restrictor configured to limit a rotational movement of at least one of the links.

18. A multi-stage seatback extension system, comprising:
 a backrest base assembly;
 an extendable backrest assembly moveably coupled to the backrest base assembly by a plurality of extension members coupled to the extendable backrest assembly and a plurality of ports on the backrest base assembly configured to receive the plurality of extension members, wherein respective ones of the plurality of extension members are configured to slide within respective ones of the plurality of ports;
 an extension assist assembly comprising a gas spring with a first end and a second end, the first end coupled to the one or more extension members and the second end coupled to a fixed point relative to the extendable backrest assembly;
 an extendable headrest assembly coupled to the extendable backrest assembly, the extendable headrest assembly comprising:
  a stationary member coupled to the extendable backrest assembly;
  a movable cross member;
  at least two lower links rotationally coupled to respective lower pivot joints of the stationary member;
  at least two upper links rotationally coupled to respective upper pivot joints of the moveable cross member, wherein respective ones of the at least two lower links are coupled to respective ones of the at least two upper links by respective link pivot joints; and
  one or more rotary dampers coupled to one or more of: the respective lower pivot joints of the stationary member, the respective pivot joints of the moveable cross member, or the respective link pivot joints.

19. The multi-stage seatback extension system of claim 18, further comprising:
 at least one motion restrictor configured to limit a rotational movement of at least one of the links.

* * * * *